United States Patent
Wu et al.

(10) Patent No.: US 8,778,080 B2
(45) Date of Patent: Jul. 15, 2014

(54) APPARATUS FOR DOUBLE-PLASMA GRAFT POLYMERIZATION AT ATMOSPHERIC PRESSURE

(75) Inventors: Mien-Win Wu, Taoyuan County (TW); Tien-Hsiang Hsueh, Taipei County (TW); Cheng-Chang Hsieh, Chiayi (TW); Chi-fong Ai, Taoyuan County (TW)

(73) Assignee: Institute of Nuclear Energy Research, Atomic Energy Council, Lungtan, Taoyuan (TW)

(*) Notice: Subject to any disclaimer, the term of this patent is extended or adjusted under 35 U.S.C. 154(b) by 1612 days.

(21) Appl. No.: 12/124,685

(22) Filed: May 21, 2008

(65) Prior Publication Data

US 2009/0291226 A1    Nov. 26, 2009

(51) Int. Cl.
| | | |
|---|---|---|
| C08F 2/46 | (2006.01) | |
| C23C 16/513 | (2006.01) | |
| B05D 3/04 | (2006.01) | |
| C08F 2/52 | (2006.01) | |
| B05D 7/04 | (2006.01) | |
| B05D 3/14 | (2006.01) | |
| B05D 1/18 | (2006.01) | |

(52) U.S. Cl.
CPC ............. *C08F 2/52* (2013.01); *B05D 3/0446* (2013.01); *B05D 2252/02* (2013.01); *B05D 1/18* (2013.01); *B05D 7/04* (2013.01); *B05D 3/147* (2013.01); *B05D 3/144* (2013.01)
USPC .................................. 118/718; 118/723 R

(58) Field of Classification Search
USPC .................... 118/718, 723 R; 156/345.2
See application file for complete search history.

(56) References Cited

U.S. PATENT DOCUMENTS

| | | | | |
|---|---|---|---|---|
| 3,942,471 | A * | 3/1976 | Brown ........................... | 118/420 |
| 2003/0116281 | A1* | 6/2003 | Herbert et al. .............. | 156/379.6 |
| 2004/0045504 | A1* | 3/2004 | Yajima et al. ................. | 118/719 |
| 2005/0129919 | A1* | 6/2005 | Michiels .................... | 428/292.1 |
| 2005/0178330 | A1* | 8/2005 | Goodwin et al. .......... | 118/723 E |
| 2006/0249501 | A1* | 11/2006 | Hung et al. ................... | 219/390 |

* cited by examiner

*Primary Examiner* — Parviz Hassanzadeh
*Assistant Examiner* — Nathan K Ford
(74) *Attorney, Agent, or Firm* — Jackson IPG PLLC

(57) ABSTRACT

Disclosed is an atmospheric-pressure double-plasma graft polymerization apparatus. The apparatus includes a workbench, an initial roller of a roll-to-roll device, an atmospheric-pressure plasma activation device, a peroxide formation device, a coating and grafting device, a drying device, a graft polymerization and curing device, a curing device and a final roller of a roll-to-roll device. The devices are sequentially provided on the workbench.

13 Claims, 15 Drawing Sheets

APPARATUS FOR DOUBLE-PLASMA GRAFT POLYMERIZATION AT ATMOSPHERIC PRESSURE

FIELD OF THE INVENTION

The present invention relates to an apparatus and method for double atmospheric-pressure plasma-induced graft polymerization and, more particularly, to an apparatus and method for increasing the rates of the grafting and the cross-linking via combining a conventional and slow graft polymerization process with an innovative and fast atmospheric-pressure plasma-induced graft polymerization and curing process.

DESCRIPTION OF THE RELATED ART

Free radical polymerization is the major process to modify the surface properties of polymeric materials in the current commercial market. In such a process, one of the indispensable chemicals is the initiators for radical generation, in which the peroxides such as $H_2O_2$ and $K_2S_2O_8$, and azo-compounds have been most commonly used. Furthermore, to enhance the wash fastness of the polymeric materials such as woven fabrics, cross-linking agents containing formaldehydes are also required. Prior to the graft process, the surfaces of the polymeric materials are also activated with acid or base chemicals to enhance the coating uniformity of the grafting solution, the graft rates and the wash fastness of the coated substrate. Although the coated and grafted substrates with required good quality in various functionalities and wash fastness can be achieved by employing these chemicals with high concentrations, one of the greatest disadvantages for these traditional manufacturing processes is that the water wastes of these chemical processes could cause serious pollutions t o our environment.

Instead of using chemicals in the conventional manufacturing processes, the plasmas, produced by applying electric energy on inert gas such as helium, argon, clean & dry air or their mixtures, is one of the best alternatives. Plasma consists of a variety of active species such as electrons, ions, free radicals and ultraviolet lights. Although these species can effectively and efficiently generate free radicals and broken chemical bonds on the surfaces of the polymeric materials, they are non-toxic and environmentally friendly to our earth because they are absorbed by air or other materials in very short distances. After exposure to the oxygen in air, these free radicals can be further converted into highly active species such as peroxides.

Among all types of plasmas, vacuum or low-pressure plasma is the most maturely developed at the present. However, the costs for vacuum equipment and its operation are rather high. Moreover, the size of the substrates that can be processed are seriously limited for the vacuum plasma due to the size of the equipment available.

The disadvantages of the vacuum plasma mentioned above can be readily overcome by atmospheric-pressure plasma. The generation technology of the atmospheric-pressure plasma is however much more difficult than that of the vacuum plasma.

In 1988, it was found for the $1^{st}$ time by Kanazawa et al. that stable atmospheric glow discharge plasmas can be generated under certain conditions. In this case, there is no need for expensive vacuum equipment and no limit on the sizes of the substrates. This indicates that there is a great potential for the application of the atmospheric-pressure plasma in the industry. Since then, a lot of efforts have been devoted by the plasma experts around the world to the development of various atmospheric-pressure plasma sources and their related application techniques. Among these atmospheric-pressure plasma sources, the one that can continuously execute the surface treatments are the most suitable for modifying polymeric materials such as rolls of woven fabrics, polyethylene terephthalate(PET) and other polymeric films.

The related techniques of atmospheric-pressure plasma can be found in U.S. Pat. No. 5,456,972, "Method and Apparatus for Glow Discharge Plasma Treatment of Polymeric Materials at Atmospheric Pressure", issued to Roth et al. in 1995, U.S. Pat. No. 5,529,631, "Apparatus for the Continuous Surface Treatment of Sheet Material", issued to Yoshikawa in 1996 and US Patent Publication No. 20030116281 A1 filed by Anthony Herbert et al. in 2003. However, these plasma sources and techniques are only applied to the activation of surfaces. They do not include the design of the relevant apparatus for their following graft polymerization.

Referring to FIG. 15, shown is a schematic for the conventional coating apparatus using atmospheric-pressure plasma. Details of this apparatus can be found in Patent Publication No. WO03086031A1, "an atmospheric pressure plasma assembly", filed by Goodwin Andrew James in 2003. This coating apparatus consists of a plasma generation region 81 for the activation of substrates, and a plasma generation and deposition region 82 for the deposition. Above the plasma generation and deposition region 82, there is an apparatus 83 for the injection and ultrasonic atomization of liquid precursors. Via an entrance 84, the working gas of plasma is introduced into the plasma region 81 and the plasma generation and deposition region 82 at required flow rates so that the atmospheric-pressure plasma assembly can be applied to plasma-induced graft polymerization and coating. There are however at least three drawbacks associated with this atmospheric-pressure plasma assembly.

Firstly, if the graft solutions with high viscosity such as chitosan polymers are used in the coating process, not only its pipes could easily be jammed, but also it could not easily be ultrasonically atomized. Thus, this apparatus can only be applied to the graft solutions of monomers or oligomers, and not to polymer solutions. Nevertheless, polymers are much low in their prices and much more easily available in market than monomers and oligomers, especially for the naturally occurring polymers.

Secondly, after the dissociation of the atomized precursors with high molecular weight in the plasma generation and deposition region 82, in addition to its deposition on the required substrate, some of the dissociated precursors could also adhere to the dielectric plates of the electrode assemblies 85a and 85b, resulting in the variations of the dielectric constants of the dielectric plates and the original characteristics of the plasma sources as well as the optimal process parameters. To tackle this problem, not only the dielectric plates must be cleaned quite often, but the optimal parameters of the process must also be adjusted from time to time. Obviously the whole process will be much more complicated and its throughput will be greatly reduced.

Thirdly, there is no design of the devices for uniform gas entrance, gas exit and single channel flow of plasma gases so that the spatial density of the plasma is not homogeneous. Thus, the uniformity of film thickness and the quality of the resultant coating are also affected greatly accordingly.

The present invention is therefore intended to obviate completely the problems encountered in prior art.

SUMMARY OF THE INVENTION

The primary objective of the present invention is to provide an apparatus and method of atmospheric-pressure double-plasma graft polymerization.

To achieve the primary objective of the present invention, the apparatus includes a workbench for position-fixing devices, a roll-to-roll devices, an atmospheric-pressure plasma activation device, a peroxide formation device, a coating and grafting device, a drying device, a graft polymerization and curing device, and a curing device. The double-plasma graft polymerization is conducted via a roll-to-roll process. The workbench includes an electrically insulated base plate. The atmospheric-pressure plasma activation device is fastened to the workbench device and includes an electrode assembly, a uniform gas entrance device and a uniform gas exit device. The peroxide formation device is connected to the atmospheric-pressure plasma activation device and includes an entrance roller, an exit roller and an upper roller. The coating and grafting device is connected to the peroxide formation device and includes a graft solution tank, an entrance roller, two lower rollers, two flattening rollers, an upper roller and an exit roller. The drying device is connected to the coating and grafting device and includes a heating belt, an insulating layer, two flexible heating plates, two parallel metal plates, a temperature controller, an upper entrance roller, a lower entrance roller and an exit roller. The graft polymerization and curing device is connected to the drying device and includes an electrode assembly, a uniform gas entrance device and a uniform gas exit device. The curing device is connected to the graft polymerization and curing device and includes a heating belt, an insulating layer, two flexible heating plates, two parallel metal plates, a temperature controller, an upper entrance roller, a lower entrance roller and an exit roller. The final roller device is connected to the curing device and includes a base provided on the workbench and a reel provided on the base.

Other objectives, advantages and features of the present invention will become apparent from the following description referring to the attached drawings.

BRIEF DESCRIPTION OF THE DRAWINGS

The present invention will be described via the detailed illustration of the preferred embodiment referring to the drawings.

DETAILED DESCRIPTION OF EMBODIMENT

Figure 1:
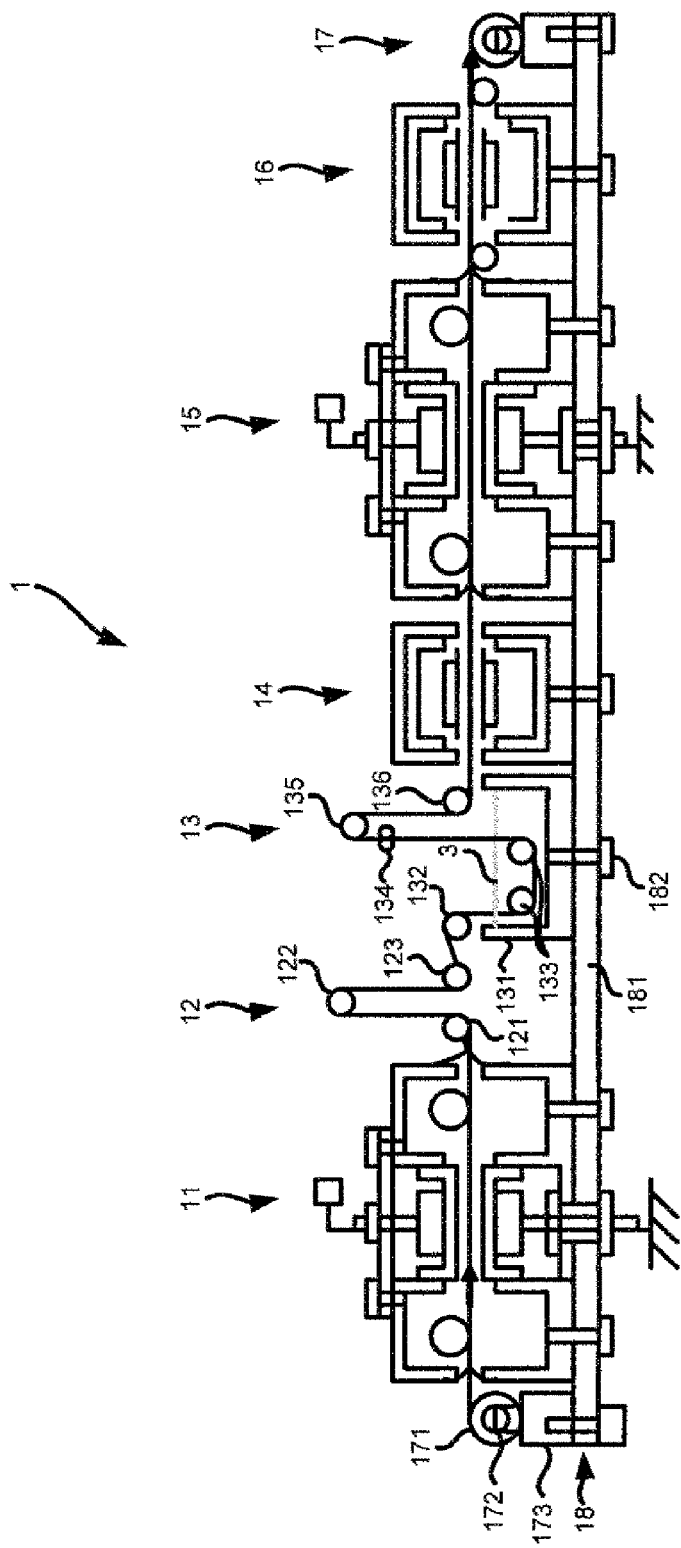
FIG. 1 is a schematic of the atmospheric-pressure double-plasma graft polymerization apparatus according to the preferred embodiment of the present invention.

Referring to FIG. 1, shown is an atmospheric-pressure double-plasma graft polymerization apparatus 1 according to the preferred embodiment of the present invention. The apparatus 1 includes, an atmospheric-pressure plasma activation device 11, a peroxide formation device 12, a coating and grafting device 13, a drying device 14, an atmospheric-pressure plasma graft polymerization and curing device 15, a curing device 16, a roll-to-roll device 17, and a workbench 18 for the positioning of various devices.

Figure 2:
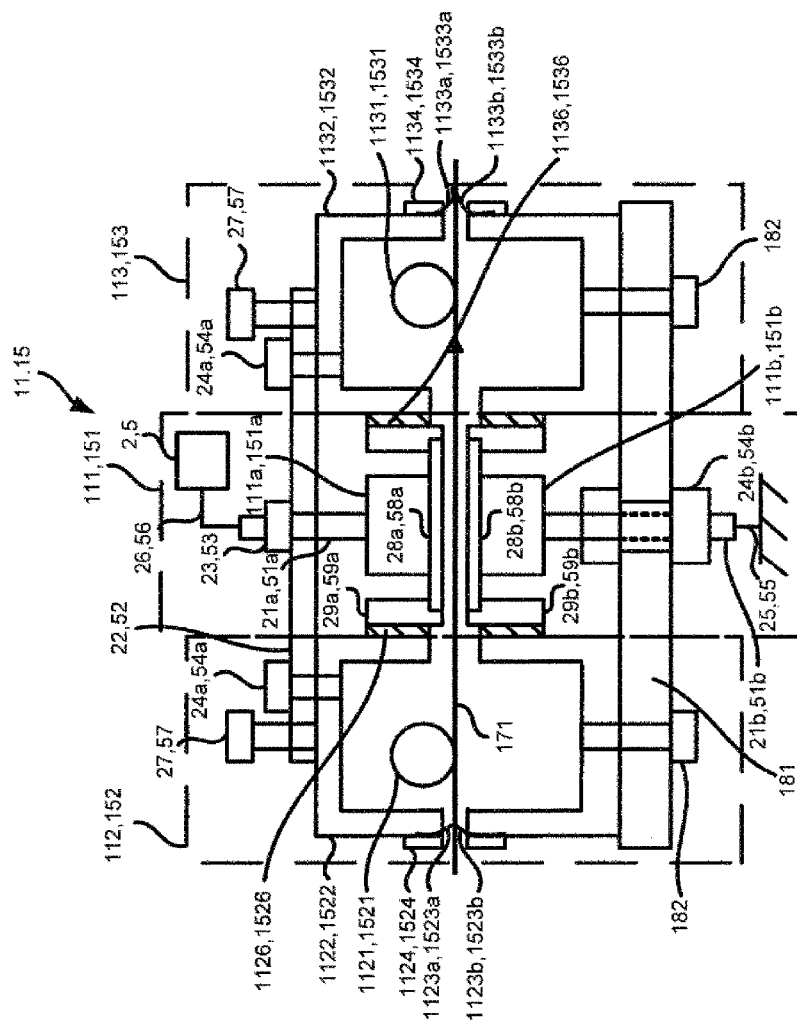
FIG. 2 is a cross-sectional view of an atmospheric-pressure plasma activation device and a plasma graft polymerization and curing device of the apparatus shown in FIG. 1.

Referring to FIG. 2, the plasma activation device 11 includes an electrode assembly 111, a uniform gas entrance device 112 and a uniform gas exit device 113.

Similarly, the plasma-induced graft polymerization and curing station 15 includes an electrode assembly 151, a uniform gas entrance device 152 and a uniform gas exit device 153.

Referring to FIG. 1, the peroxide formation device 12 is connected to the plasma activation device 11. The peroxide formation device 12 includes an entrance roller 121, an upper roller 122 and an exit roller 123.

The coating and grafting device 13 is connected to the peroxide formation device 12. The coating and grafting device 13 includes a graft solution tank 131, an entrance roller 132, two lower rollers 133 installed in the graft solution tank 131, a pair of thinning rollers 134 of coating, an upper roller 135 and an exit roller 136. The gap between the pair of thinning roller 134 is adjustable a s required by the substrate thickness and the required thickness of the coating for graft solution.

Figure 3:
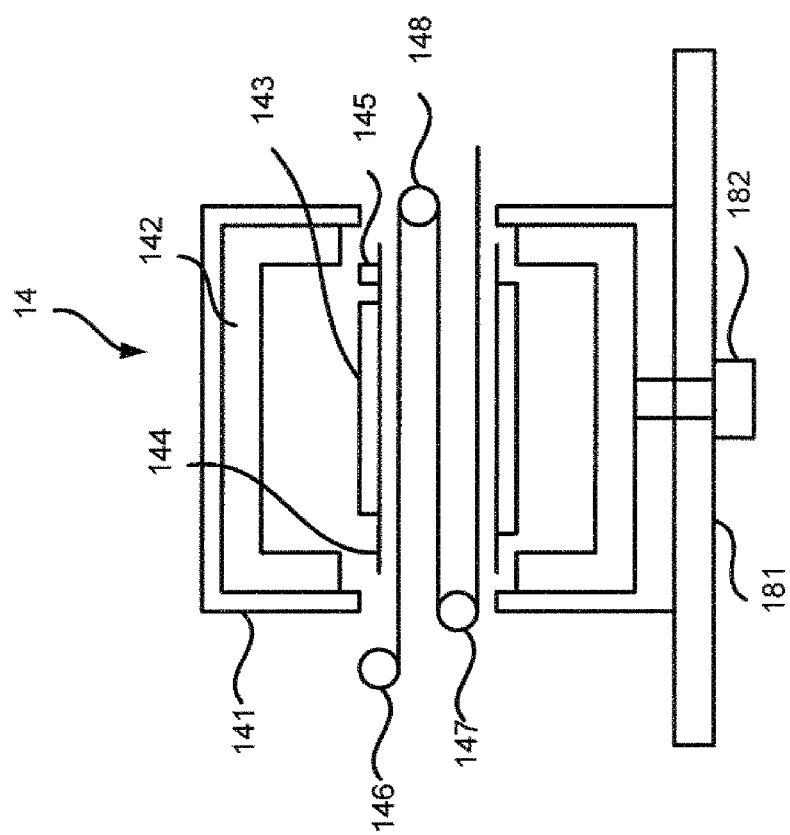
FIG. 3 is a cross-sectional view of a drying device of the apparatus shown in FIG. 1.

Referring to FIGS. 1 and 3, the drying device 14 is connected to the coating and grafting device 13. The drying device 14 includes a heating chamber 141, a thermally insulating layer 142, two flexible heating plates 143 and a temperature sensor 145 attached on two parallel metal plates 144, an upper entrance roller 146, an extended heating-time entrance roller 148 and an exit roller 147.

Figure 4:
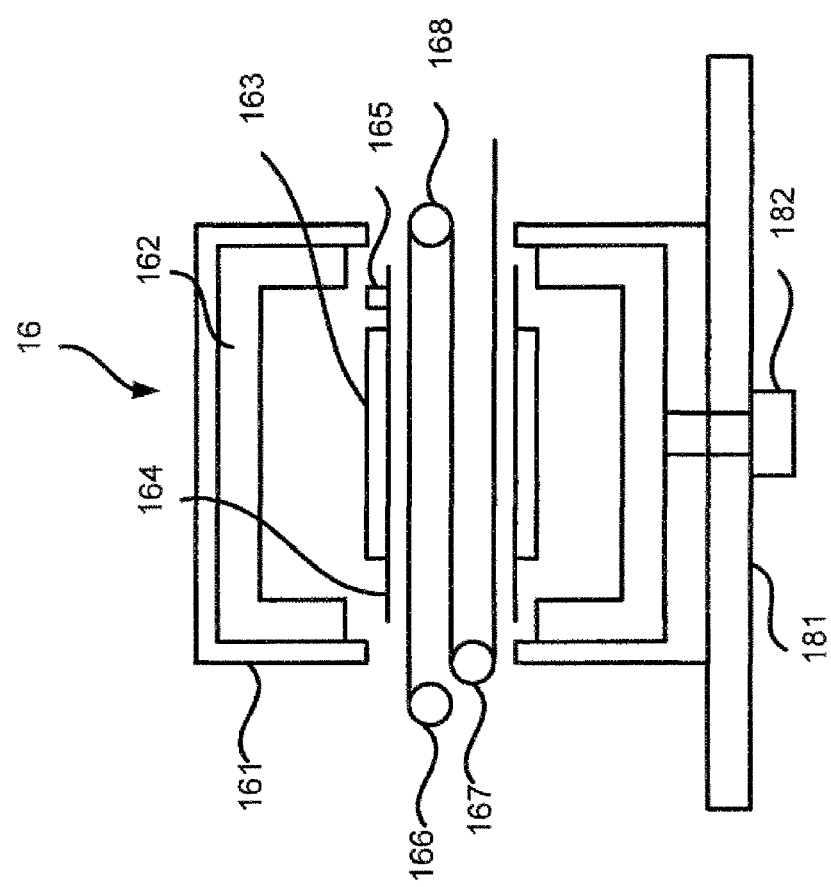
FIG. 4 is a cross-sectional view of a curing station of the apparatus shown in FIG. 1.

Referring to FIGS. 1 and 4, the curing device 16 is connected to the graft polymerization and curing device 15. The curing device 16 includes a heating chamber 161, a thermally insulating layer 162, two flexible heating plates 163 and a temperature sensor 165 attached on two parallel metal plates 164, an upper entrance roller 166, an extended heating-time entrance roller 167 and an exit roller 167.

Referring to FIG. 1, the initial roller of the roll-to-roll device 17 is located before the plasma activation device 11 and the final roller after the curing device 16. Each roller includes a base 173 locate on the electronically insulating board 181 and a reel 172 rotationally provided on the base 173. At first, a substrate 171 is wound on the reel 172 of the initial roller of the roll-to-roll device 17, and then is reeled out from the reel 172 of this initial roller. The substrate 171 is coated when it is moved through the devices 11 to 16. Finally, the substrate 171 after coating is wound onto the final roller of the roll-to-roll device 17.

The workbench 18 is located beneath the devices 11 to 17. The workbench 18 includes an electrically insulating board 181 and at least seven sets of fasteners 182 for fastening the devices 11 to 17 on the insulating board 181.

Referring to FIGS. 2, the electrode assembly 111 includes a pair of electrode plates 111a and 111b, a pair of dielectric barrier plates 28a and 28b, and two pairs of acrylic bars 29a and 29b. Both of the electrode plates 111a and 111b are rectangular aluminum or copper plates that is good conductor and also easily fabricated material. Each pair of acrylic bars 29a and 29b are adhered to the dielectric barrier plates 28a and 28b. Each of the electrode plates 111a and 111b is provided with a cooling device. The cooling devices provide the cooling water at room temperature to cool the electrode assembly 111, while preventing the condensation of water vapor on the electrode and the arcing during plasma discharge.

With threaded bolts 24a, an electrically insulating rectangular plate 22 is secured to the upper cover of the gas entrance chamber 1122 of the uniform gas entrance device 112 and the upper cover of the gas exit chamber 1132 of the uniform gas exit device 113. A threaded bolt 21a is extended from the upper electrode plate 111a. The threaded bolt 21a is inserted through the electrically insulating rectangular plate 22 and engaged with a nut 23 so that the upper electrode plate 111a is secured to the rectangular plate 22. Hence, the upper electrode plate 111a is attached firmly to the upper covers of the gas entrance chamber and gas exit chamber.

A threaded bolt 21b is extended from the lower electrode plate 111b. The threaded bolt 21b is inserted through the electrically insulating board 181 of the workbench 18 and engaged with a nut 24b. Hence, the lower electrode plate 111b is secured to the electrically insulating board 181 of the workbench 18.

The electrode plates 111a and 111b adhered to the dielectric barrier plates 28a and 28b are installed in parallel to each other. With the threaded bolts 27 and the threaded bolt 24a, the distance between the electrode plates 111a and 111b is adjustable. The distance is in the range of 2 to 20 mm, at least 2 mm larger than the thickness of the substrate so that there is an adequate passageway for the flow of plasma gases and the flow resistance against the plasma gas is sufficiently low.

The threaded bolt 21b is grounded via a wire 25. The threaded bolt 21a is connected to a high-voltage power supply 2 via a high-voltage cable 26. The power supply 2 is a pulsed or sinusoidal power supply. The output voltage is in the range of 1 to 30 kV. The frequency is in the range of 1 to 100 kHz.

Similarly, the electrode assembly 151 includes a pair of electrode plates 151a and 151b, a pair of dielectric barrier plates 58a and 58b, and two pairs of acrylic bars 59a and 59b. Both of the upper electrode plates 151a and 151b are rectangular aluminum or copper plates that is good conductor and also easily fabricated material. Each pair of acrylic bars 59a and 59b are adhered to the dielectric barrier plates 58a and 58b. Each of the electrode plates 151a and 151b is provided with a cooling device. The cooling devices provide cooling water at the room temperature to cool the electrode assembly 151, while preventing the condensation of water vapors on the electrode surface and the arcing during plasma discharge.

With threaded bolts 54, an electrically insulated rectangular plate 52 is secured to an upper cover of the gas entrance chamber 1522 of the uniform gas entrance device 152 and an upper cover of the gas exit chamber 1532 of the uniform gas exit device 153. A threaded bolt 51a is extended from the upper electrode plate 151a. The threaded bolt 51a is inserted through the electrically insulated rectangular plate 52 and engaged with a nut 53 so that the upper electrode plate 151a is secured to the rectangular plate 52. Hence, the upper electrode plate 151a is attached firmly to the upper covers of the uniform gas entrance chamber and uniform gas exit chamber.

A threaded bolt 51b is extended from the lower electrode plate 151b. The threaded bolt 51b is inserted through the electrically insulated board 181 of the workbench 18 and engaged with a nut 54b. Hence, the lower electrode plate 151b is secured to the board 181 of the workbench 18.

The electrode plates 151a and 151b adhered to the dielectric barrier plates 58a and 58b are installed in parallel to each other. With the threaded bolts 57 and the threaded bolt 54a, the distance between the electrode plates 151a and 151b is adjustable. The distance is in the range of 2 to 20 mm, at least 2 mm larger than the thickness of the substrate so that there is an adequate passageway for the flow of plasma gases and the flow resistance against the plasma gas is sufficiently low.

The threaded bolt 51b is grounded via a wire 55. The threaded bolt 51a is connected to a high-voltage power supply 5 via a high-voltage wire 56. The power supply 5 is a pulsed power supply or sinusoidal power supply. The output voltage is in the range of 1 to 30 kV. The frequency is in the range of 1 to 100 kHz.

Figure 5:
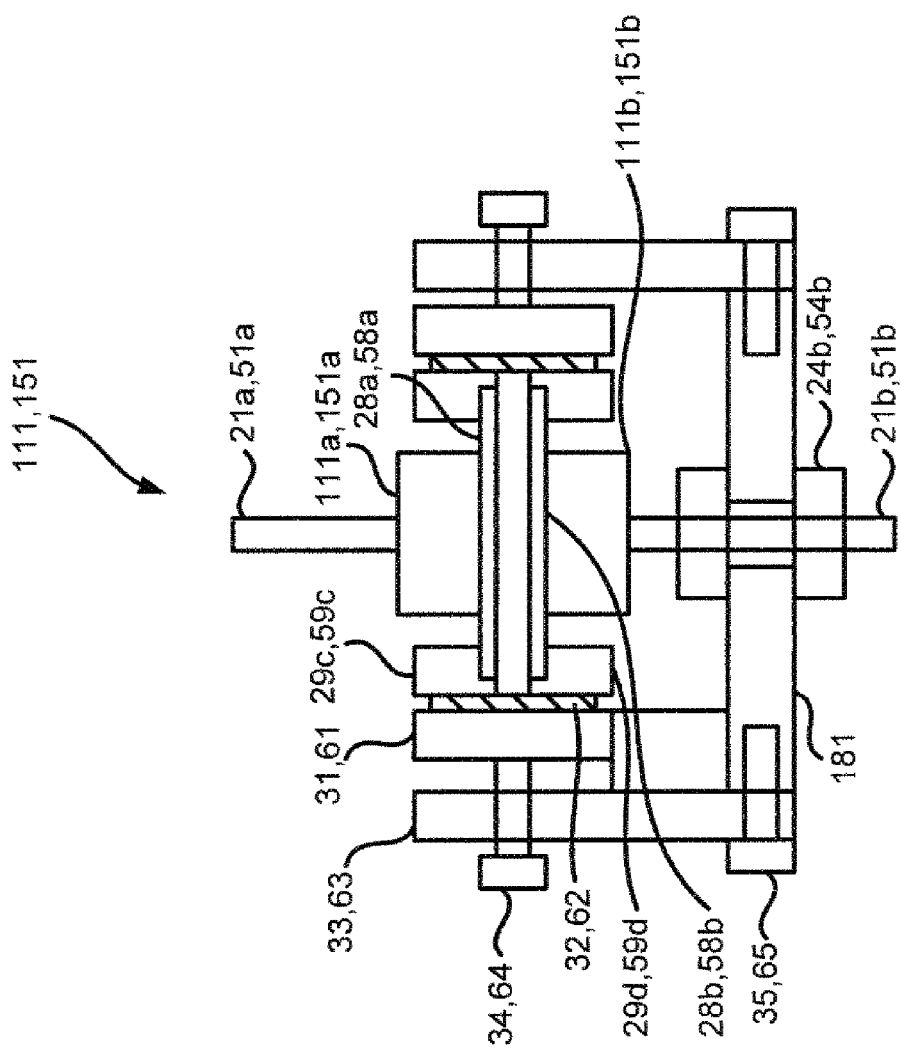
FIG. 5 is a cross-sectional view of an electrode assembly of the apparatus perpendicular to that shown in FIG. 2.

Referring to FIG. 5, with threaded bolts 35, two rectangular slabs 33 are attached to the insulating board 181. With a threaded bolt 34, a pair of gas sealing plates 31 are attached to the slabs 33. A pair of flexible pads 32 are adhered to each of the gas sealing plates 31. The pair of flexible pads 32 are made of silicone rubber for example. A pair of dielectric barrier plates 28a and 28b are adhered via an electrically insulating and thermally conductive adhesive to each of the electrode plates 111a and 111b. The thickness of the dielectric barrier plates 28a and 28b is smaller than 2 mm. Two pair of acrylic bars 29c and 29d are adhered to the dielectric barrier plates 28a and 28b and the two pair of acrylic bars 29a and 29b in FIG. 2 with silicone adhesives. Each pair of the acrylic bars 29c and 29d are abutted against a related one of the flexible pads 32. Hence, there is airtightness between the electrode plates 111a and 111b. The threaded bolts 34 are employed to adjust the air tightness between the electrode plates 111a and 111b by moving the gas sealing plate 31 forward or backward.

Similarly, with threaded bolts 65, two slabs 63 are attached to the insulated board 181. With a threaded bolt 64, a gas sealing plate 61 is attached to each of the slabs 63. A pair of flexible pads 62 are adhered to each of the sealing plates 81 via adhesive for example. The flexible pads 62 are made of silicone rubber for example. A pair of dielectric barrier plates 58a and 58b are adhered via an electrically insulating and thermally conductive adhesive to each of the electrode plates 151a and 151b. The thickness of the dielectric barrier plates 58a and 58b is smaller than 2 mm. Two pair of acrylic bars 59c and 59d are adhered to the dielectric barrier plates 58a and 58b and the two pair of acrylic bars 59a and 59b in FIG. 2 via silicone adhesives. Each pair of the acrylic bars 59c and 59d are abutted against a related one of the flexible pads 62. Hence, there is air tightness between the electrode plates 151a and 151b. The threaded bolts 64 are operable to adjust the air tightness between the electrode plates 151a and 151b.

Figure 6:
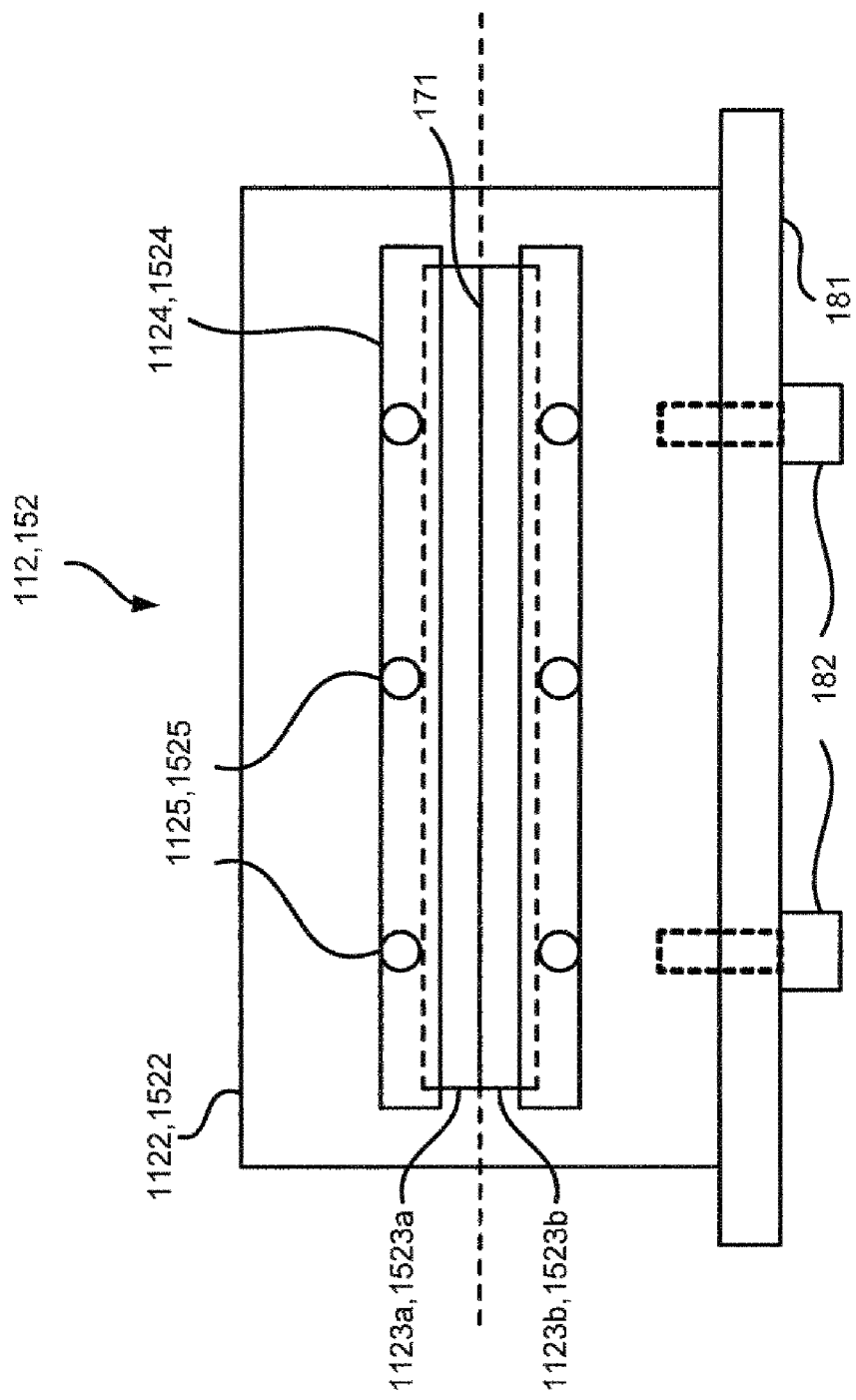
FIG. 6 is a side view of the entrance of the uniform gas entrance device used in the apparatus shown in FIG. 2.

Referring to FIG. 6, the entrance of the uniform gas entrance device 112 includes a gas entrance chamber 1122, a pair of flexible sealing plates 1123a and 1123b, a substrate 171 moving into the paper two crossbars 1124 and threaded bolts 1125.

Similarly, the entrance of the uniform gas entrance device 152 includes a gas entrance chamber 1522, a pair of flexible sealing plates 1523a and 1523b, a substrate 171 moving into the paper, two crossbars 1524 and threaded bolts 1525.

Figure 7:
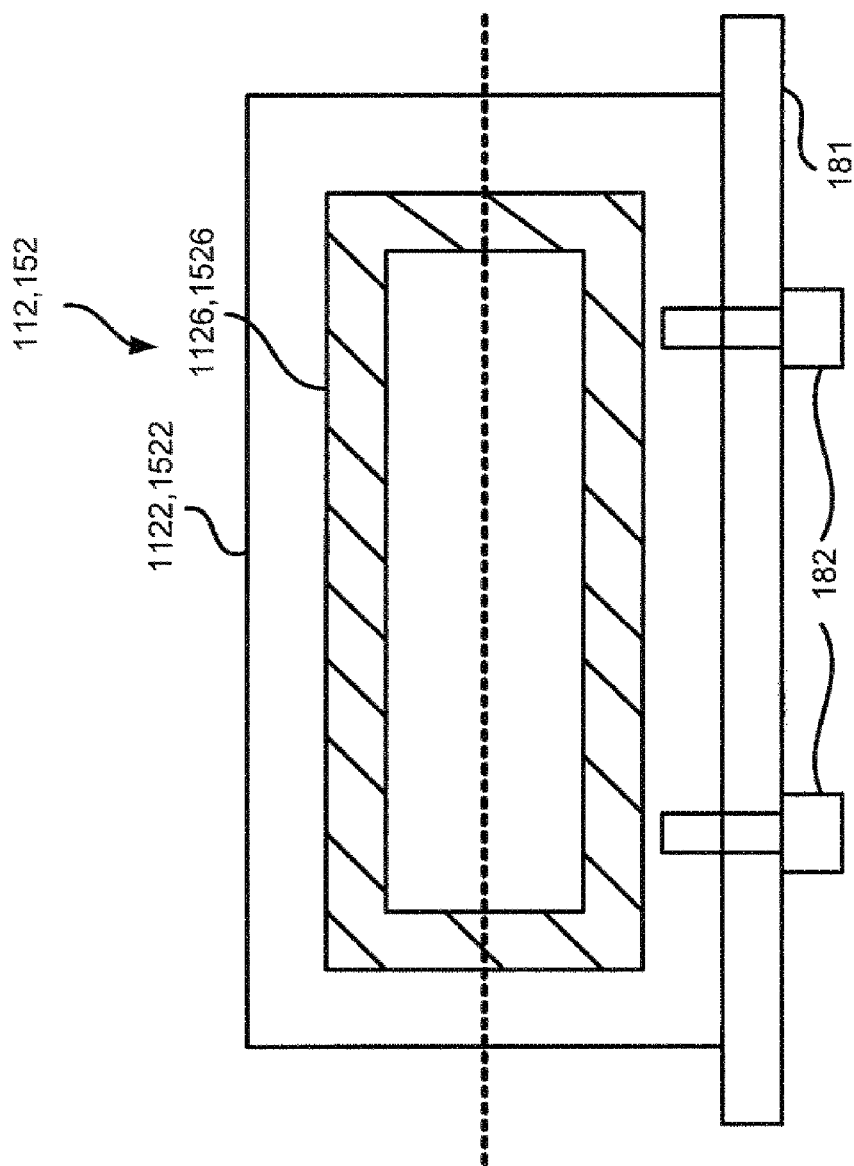
FIG. 7 is a side view of the exit of the uniform gas entrance device shown in FIG. 2.

Referring to FIG. 7, a flexible hollow gasket 1126 is adhered to the chamber wall at the exit of the gas entrance chamber 1122 for gas sealing with electrode assembly 111. The flexible hollow gasket 1126 is made of silicone rubber for example.

Similarly, a flexible hollow gasket 1526 is adhered to the chamber wall at the exit of the gas entrance chamber 1522 for gas sealing with the electrode assembly 151. The flexible hollow gasket 1526 is made of silicone rubber for example.

Figure 8:
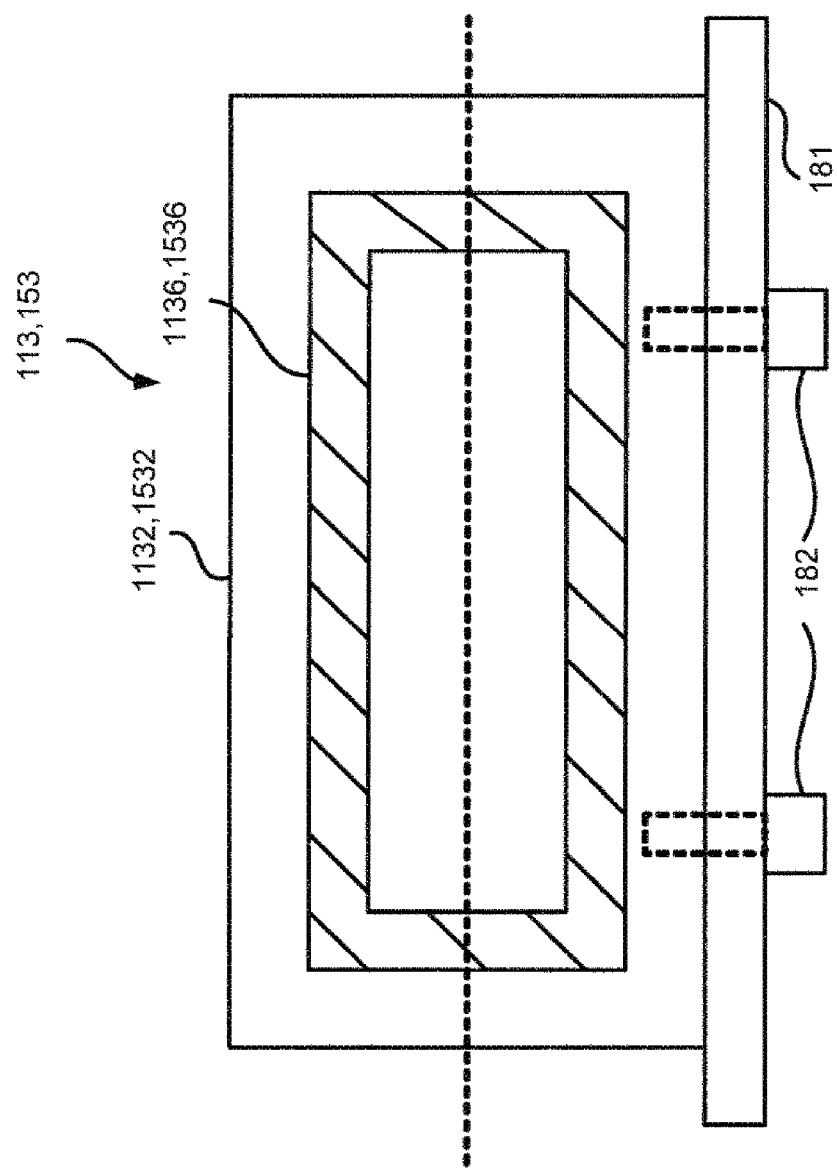
FIG. 8 is a side view of the entrance of the uniform gas exit device used in the apparatus shown in FIG. 2.

Referring to FIG. 8, a flexible hollow gasket 1136 is adhered to the chamber wall at the entrance of the gas exit chamber 1132 for gas sealing with the electrode assembly 111. The flexible hollow gasket 1136 is made of silicone rubber for example.

Similarly, a flexible hollow gasket 1536 made of silicone is adhered to the chamber wall at the entrance of the gas exit chamber 1532 for gas sealing with the electrode assembly 151. The flexible hollow gasket 1536 is made of silicone rubber for example.

Figure 9:
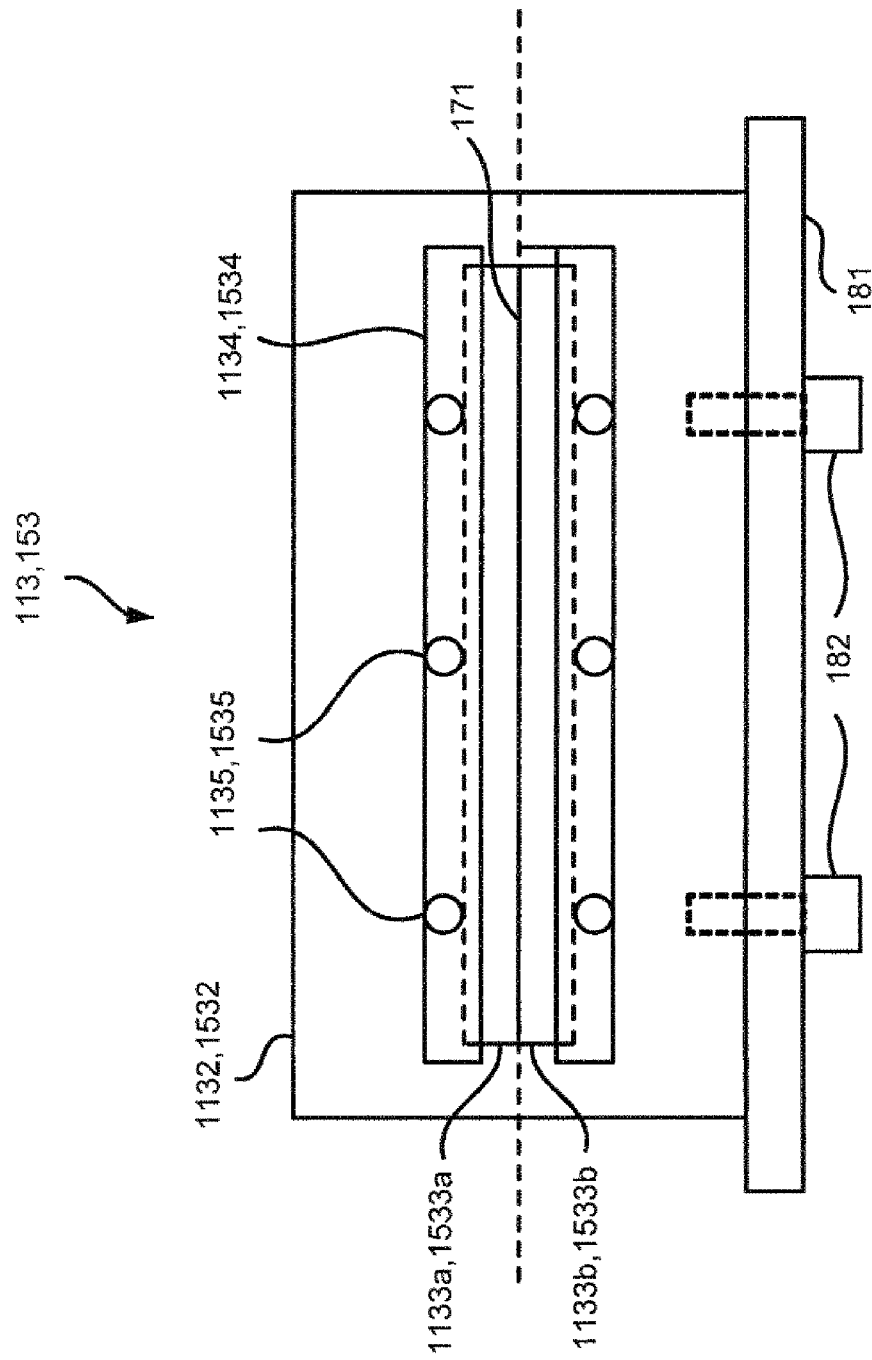
FIG. 9 is a side view of the exit of the uniform gas exit device shown in FIG. 2.

Referring to FIG. 9, the exit of the uniform gas exit device 113 includes a gas exit chamber 1132, a pair of flexible sealing plates 1133a and 1133b, a substrate 171 moving out of the paper, two crossbars 1134 and threaded bolts 1135.

Similarly, the exit of the uniform gas exit device 153 includes a gas exit chamber 1532, a pair of flexible sealing plates 1533a and 1533b, a substrate moving out of the paper, two crossbars 1534 and threaded bolts 1535.

Figure 10:
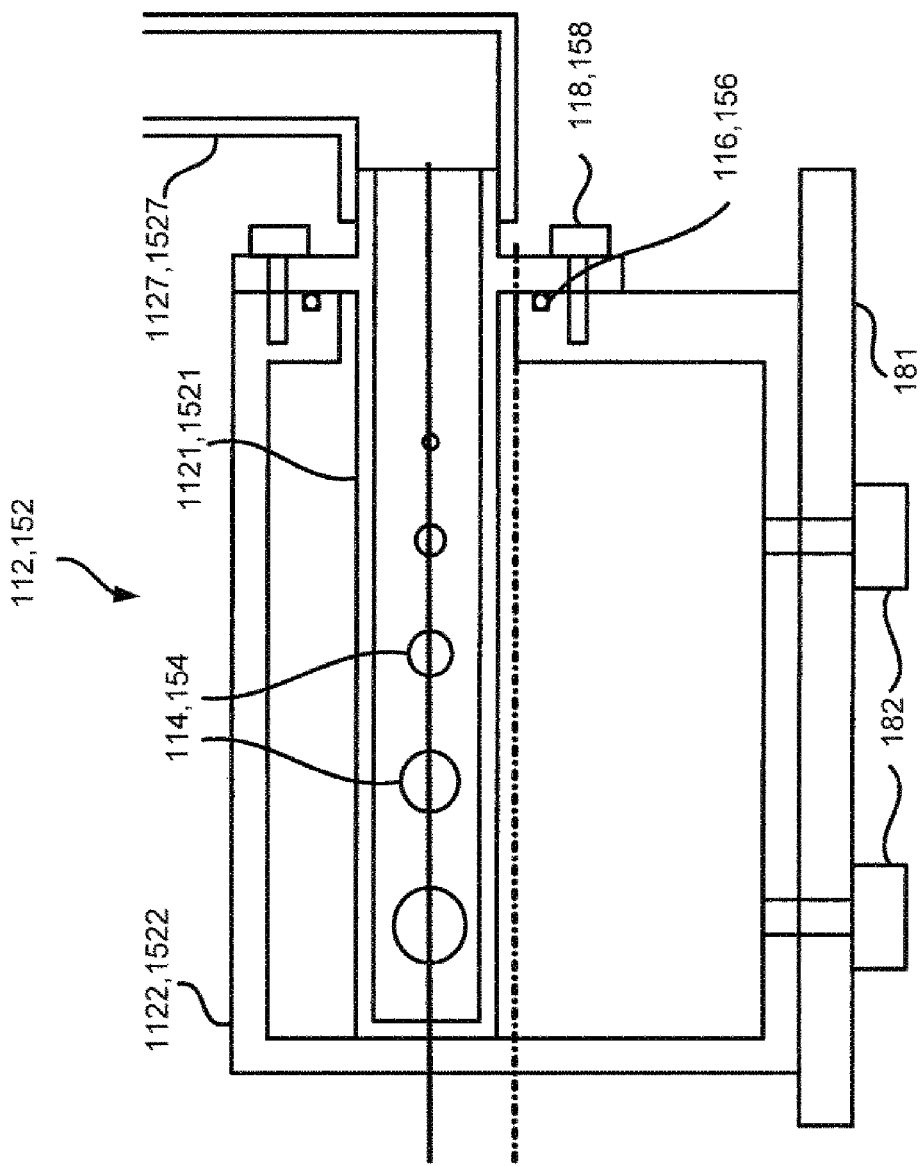
FIG. 10 is a cross-sectional view of the uniform gas entrance device including the uniform gas entrance pipes shown in FIG. 2.
Figure 11:
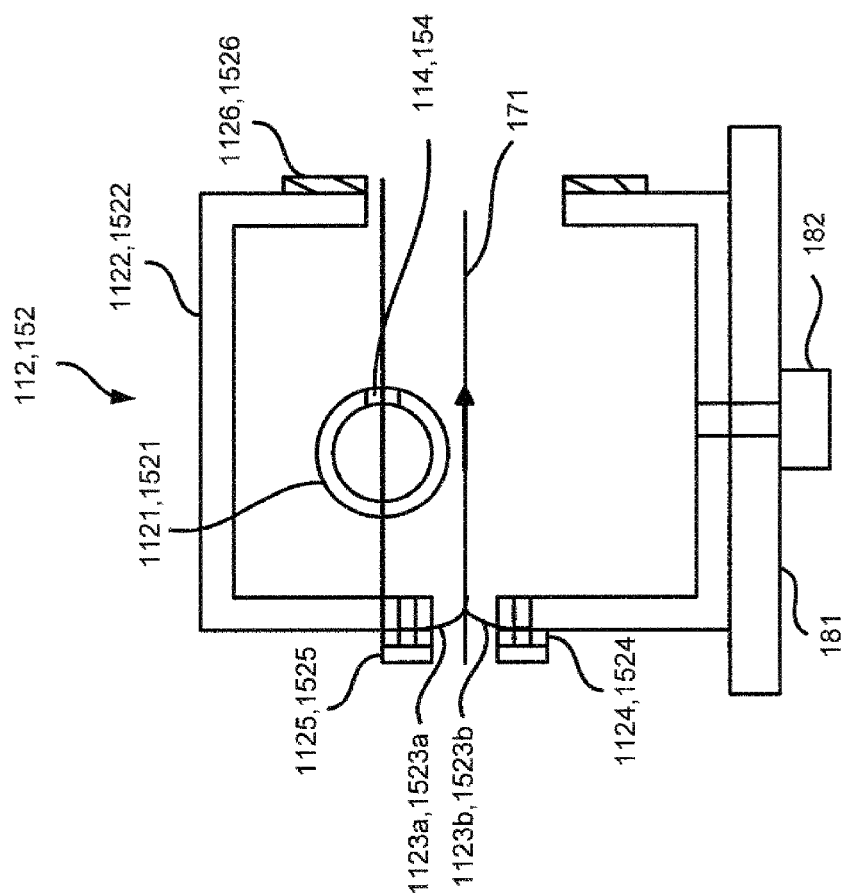
FIG. 11 is a cross-sectional view of the uniform gas entrance device in the plane perpendicular to that shown in FIG. 10.

Referring to FIG. 10, with threaded bolts 118, an annular flange of the uniform gas entrance pipe 1121 is attached to the gas entrance chamber 1122. A sealing O-ring 116 is located between the annular flange of the uniform gas entrance pipe 1121 and the gas entrance chamber 1122. The uniform gas entrance pipe 1121 is connected to a flexible gas tube 1127. The uniform gas entrance pipe 1121 includes apertures 114 defined in the periphery thereof. The apertures 114 get bigger further from the flexible tube 1127.

Similarly, with threaded bolts 158, an annular flange of the uniform gas entrance pipe 1521 is attached to the gas entrance chamber 1522. A sealing O-ring 156 is located between the annular flange of the uniform gas entrance pipe 1521 and the gas entrance chamber 1522. The uniform gas entrance pipe 1521 is connected to a flexible tube 1527. The uniform gas entrance pipe 1521 includes apertures 154 defined in the periphery thereof. The apertures 154 get bigger further from the flexible tube 1527.

Referring to 11, the uniform gas entrance device 112 includes a gas entrance chamber 1122, an uniform gas entrance pipe 1121 with its aperture 114, a pair of flexible sealing plates 1123a and 1123b, a substrate 171, a flexible hollow gasket 1126, two crossbars 1124 and threaded bolts 1125.

Similarly, the uniform gas entrance device 152 includes a gas entrance chamber 1522, an uniform gas entrance pipe 1521 with its aperture 154, a pair of flexible sealing plates 1523 a and 1523b, a substrate 171, a flexible hollow gasket 1526, two crossbars 1524 and threaded bolts 1525.

Figure 12:
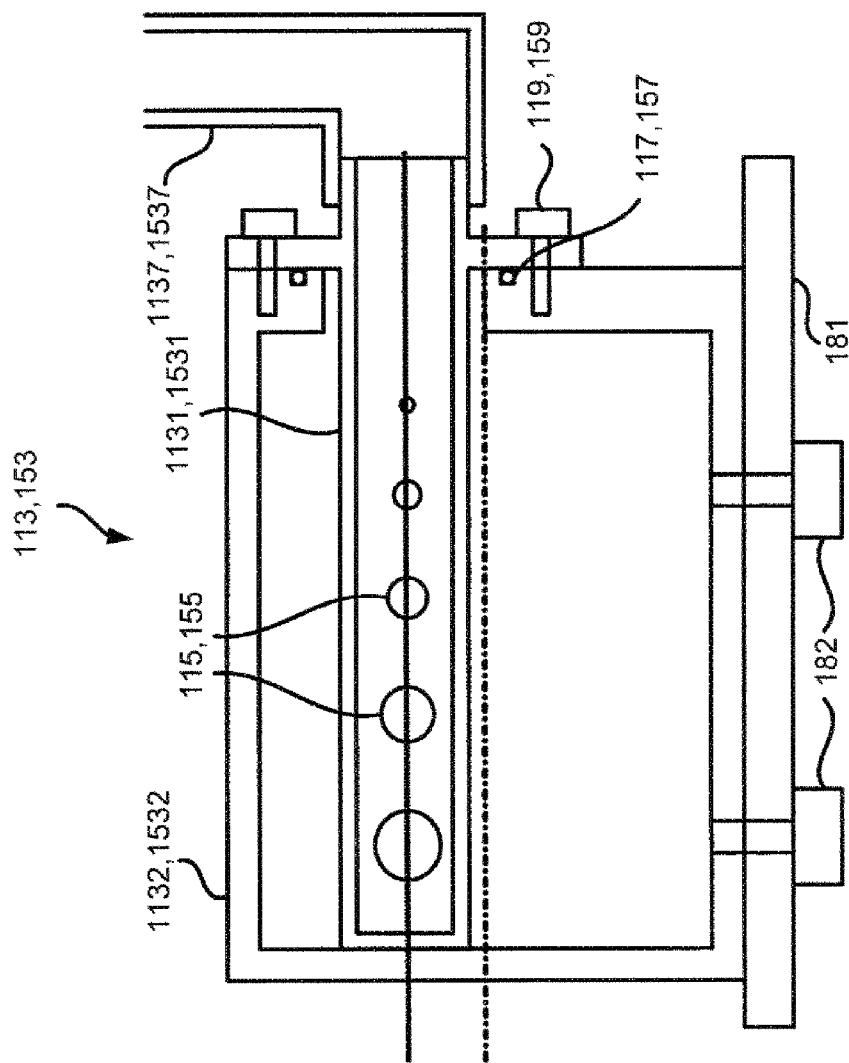
FIG. 12 is a cross-sectional view of the uniform gas exit device shown in FIG. 2.

Referring to FIG. 12, with threaded bolts 119, an annular flange of the uniform gas exit pipe 1131 is attached to the gas exit chamber 1132. A sealing ring 117 is located between the annular flange of the uniform gas exit pipe 1131 and the gas exit chamber 1132. The uniform gas exit pipe 1131 is connected to a flexible gas tube 1137. The uniform gas entrance 1131 includes apertures 115 defined in the periphery thereof. The apertures 115 get bigger further from the flexible tube 1137.

Similarly, with threaded bolts 159, an annular flange of the uniform gas entrance 1531 is attached to the gas entrance chamber 1532. A sealing ring 157 is located between the annular flange of the uniform gas entrance 1531 and the gas entrance chamber 1532. The uniform gas exit pipe 1531 is connected to a flexible tube 1537. The uniform gas entrance 1531 includes apertures 15 5 defined in the periphery thereof. The apertures 155 get bigger further from the flexible tube 1537.

Figure 13:
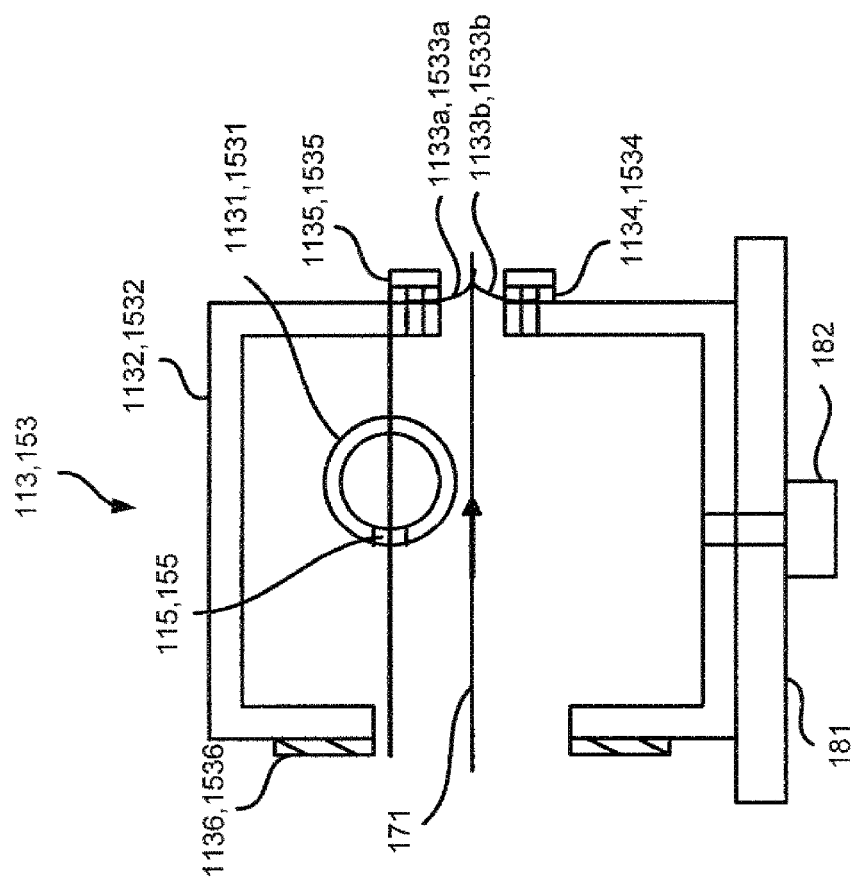
FIG. 13 is a cross-sectional view of the uniform gas exit device in the plane perpendicular to that shown in FIG. 12.

Referring to FIG. 13, the uniform gas exit device 113 includes a gas exit chamber 1132, an uniform gas entrance pipe 1131 with its aperture 115, a pair of flexible sealing plates 1133a and 1133b, a substrate 171, a flexible hollow gasket 1136, two crossbars 1134 and threaded bolts 1135.

Similarly, the uniform gas exit device 153 includes a gas entrance chamber 1532, an uniform gas entrance pipe 1531 with its aperture 155, a pair of flexible sealing plates 1533a and 1533b, a substrate 171, a flexible hollow gasket 1536, two crossbars 1534 and threaded bolts 1535.

The apertures 114, 115, 154 or 155 get smaller closer to the flexible tube 1127, 1137, 1527 or 1537 so that the resistance against the flowing of working gas for the plasma gets higher closer to the flexible tube 1127, 1137, 1527 or 1537. Thus, the flow rates of the working gas along the gas pipes are similar in different positions along each passageway for the working gas. The working gas may be helium, argon, oxygen, nitrogen, carbon dioxide, air or any combination of them depending on various applications.

Figure 14:
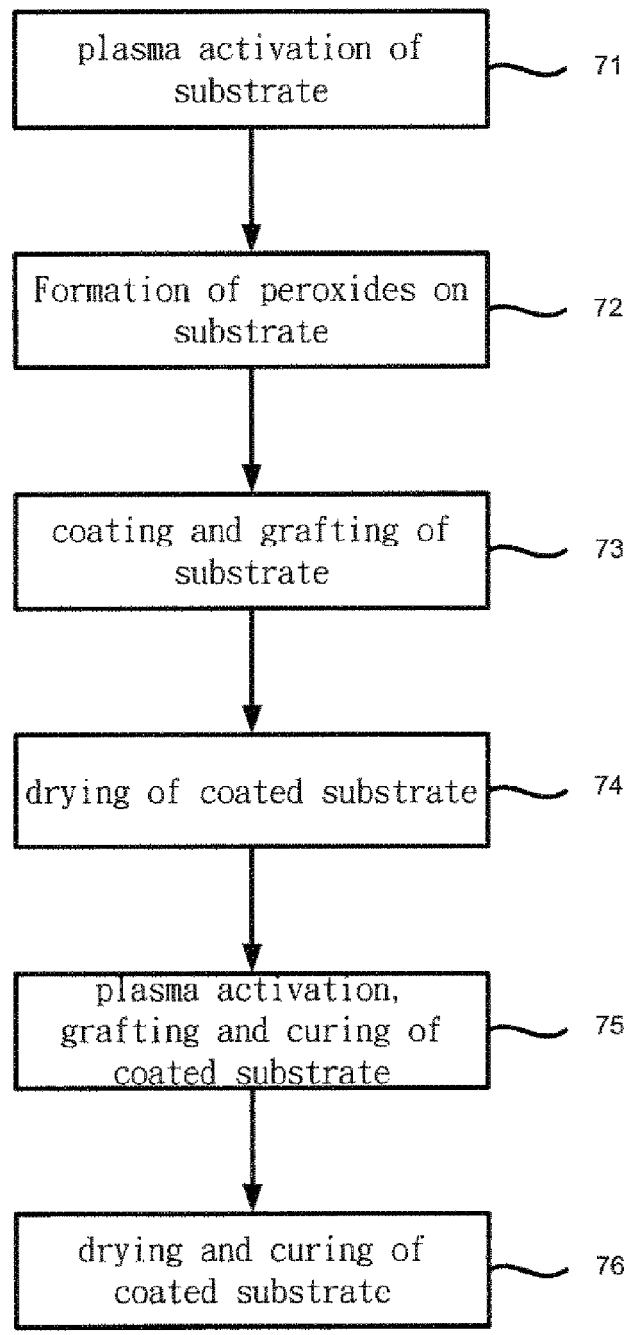
FIG. 14 is a flow chart of the procedures executed in the apparatus of FIG. 1.
Figure 15:
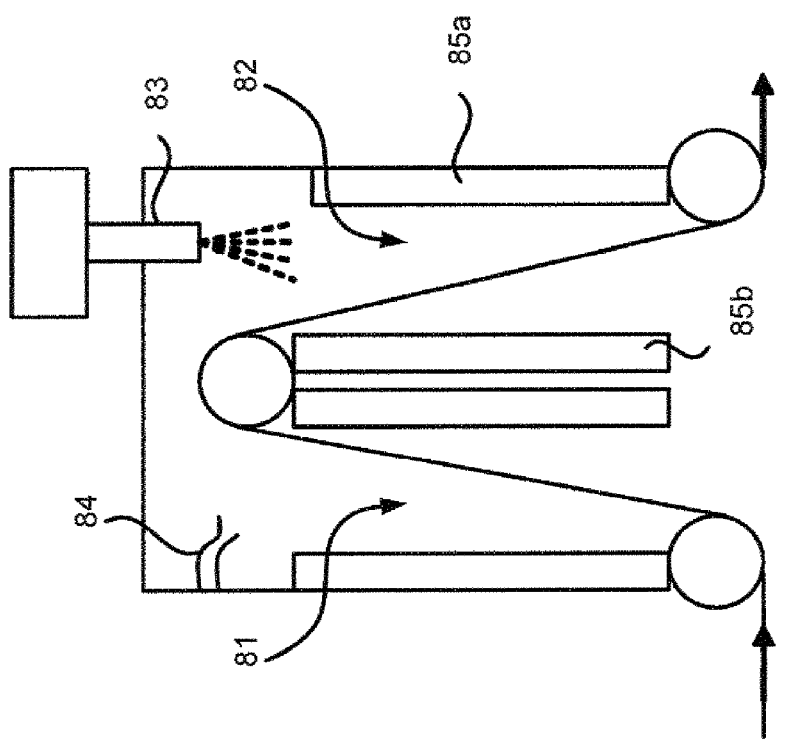
FIG. 15 is a schematic of the conventional plasma coating apparatus at atmospheric pressure according to the prior art.

The process of the double-plasma graft polymerization executed in apparatus 1 is shown in FIG. 14, including procedures 71 to 76. For example, chitosan polymer dissolved in water is used a s the graft solution, while polymeric woven fabric is used as the substrate.

Starting with process 71, the substrate 171 is transferred to the plasma activation device 11 from the initial roller of the roll-to-roll device 17. In the plasma activation device 11, glow discharge plasma is generated by feeding the required working gases at an appropriate flow rate and applying a high-voltage power with its plasma power density of ≥0.5 W/cm$^2$ and the substrate 171 is activated via the formation of free radicals on the surface of the substrate 171.

In the process 72, the plasma activated substrate 171 is transferred to the peroxide formation device 12. In the peroxide formation device 12, the activated substrate 171 is exposed to air. Oxygen in the air reacts with the free radicals and thus the peroxides are formed on the surface of the substrate 171.

In process 73, the substrate 171 is transferred to the coating and grafting device 13 from the peroxide formation device 12. In the coating and grafting device 13, the peroxide-forming substrate 171 is submerged in graft solution 3 that contains the required functional group. Thus, the substrate 171 is coated with the graft solution 3 as it is transferred out of the solution. The thickness of the coating is controlled by adjusting the height of the upper roller 135 and the gap of a pair of thinning rollers 134. Some of the plasma-induced graft polymerization occurs between the peroxide-formation substrate 171 and the coated graft solution 3. In this process, the graft rate is inherently slow due to the low activity of the coated graft solution.

In process 74, the coated substrate 171 is transferred to the drying device 14 from the coating and grafting device 13. In the drying device 14, the graft solution 3 on the substrate 171 is heated at 80 to 100 degrees Celsius until so that 90% to 95% of water in the coated graft solution is removed.

In process 75, the graft-solution coated and dried substrate 171 is moved to the graft polymerization and curing device 15. In the graft polymerization and curing device 15, a mixed glow and filamentary discharge plasma is generated by feeding the required working gases at an appropriate flow rate and applying a high-voltage power on the electrode assembly. The graft-solution coated and dried substrate 171 is thus irradiated by the plasma, which comprises electrons, ions, free radicals and ultraviolet light. Thus, not only the activity of the substrate 171 is enhanced by plasma activation and plasma roughing. The activity of graft solution 3 is also significantly improved by the dissociation and bond-breaking of the large polymer molecules in the graft solution via plasma irradiation. Therefore, the graft rate is greatly increased due the higher activity for both substrate and graft solution. Moreover, the cross-linking of the grafted bonds both in the previous coating and grafting process and in this graft polymerization process take place due to plasma irradiation. Hence, both graft rate and bond strength a r e greatly enhanced via this process.

In process 76, the substrate 171 is transferred to the curing device 16 from the graft polymerization and curing device 15. In the curing device 16, the graft polymerized and cured substrate 171 is heated at 140 to 150 degrees Celsius so that it is dried completely and its relevant grafted bond is further cross-linked at a much higher temperature.

Finally, the substrate 171 is wound onto the reel 172 of the final roller of the roll-to-roll device 17.

According to the present invention, various polymeric materials can be used and prepared as the graft solution 3. Moreover, the risk of the contamination of the electrode plates can be completely avoided. This is because the coated graft solution 3 on the substrate is already dried to over 90% and thus adhered firmly to the substrate 171 before transferring to the plasma-induced grafting and curing device 15 to be processed. Both the graft rate and its bond strength via the plasma-induced cross-linking reaction are thus greatly enhanced. Through the roll-to-roll device 17, the apparatus 1 is operated continuously and thus the throughput is high while the operation cost is also reduced. Moreover, the operation of the apparatus 1 is environmentally friendly.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An atmospheric-pressure double-plasma graft polymerization apparatus comprising, sequentially arranged:
   a workbench comprising an electrically insulating board provided thereon;
   an initial roller device of a roll-to-roll device comprising a roll of initial substrate, a base provided on the electrically insulating board of the workbench, and a reel provided on the base;
   an atmospheric-pressure plasma activation device connected to the initial roller of the roll-to-roll device and comprising the substrate, a plasma working gas, an electrode assembly, a first uniform gas entrance device and a first uniform gas exit device wherein flow rates of working gas are similar in different positions along the first uniform gas entrance device and the first uniform gas exit device;
   a peroxide formation device connected to the atmospheric-pressure plasma activation device and comprising plasma activated substrate, an entrance roller, an exit roller and an extended air-exposure time upper roller with adjustable height;
   a coating and grafting device connected to the peroxide formation device and comprising peroxide-formed substrate, a graft solution, a graft solution tank, an entrance roller, two lower rollers, a pair of thinning rollers, an upper roller and an exit roller;
   a drying device connected to the coating and grafting device and comprising initially grafted substrate with the graft solution coated on two sides of the peroxide-formed substrate, a heating chamber, an thermally insulating layer, two flexible heating plates and a temperature sensor attached to two parallel metal plates, an upper entrance roller, an extended heating-time entrance roller and an exit roller;
   an atmospheric-pressure graft polymerization and curing device connected to the drying device and comprising initially grafted substrate with the graft solution coated on the substrate and dried to 90 to 95% as graft polymerization and curing agent, a plasma working gas, an electrode assembly, a second uniform gas entrance device and a second uniform gas exit device wherein flow rates of working gas are similar in different positions along the second uniform gas entrance device and the second uniform gas exit device;
   a curing device connected to the graft polymerization and curing device and comprising graft polymerized and cured substrate, a heating chamber, a thermally insulating layer, two flexible heating plates and a temperature sensor attached to two parallel metal plates, an upper entrance roller, an extended heating-time entrance roller and an exit roller; and
   a final roller of a roll-to-roll device connected to the curing device and comprising a roll of cured substrate, a base provided on the workbench and a reel provided on the base.

2. The apparatus according to claim 1, wherein each of the electrode assemblies comprises a pair of metal electrode plates attached with a pair of dielectric barrier plates installed in parallel configuration.

3. The apparatus according to claim 2, wherein each of the electrode assemblies comprises a rectangular metal electrode plate, a middle threaded bolt extended from the upper electrode and connected to an electrically insulating rectangular plate, a nut engaged with the threaded bolt and two lateral threaded bolts for fastening the rectangular electrically insulating plate.

4. The apparatus according to claim 2, wherein each of the electrode assemblies comprises a cooling device connected to each of the upper and lower electrode plates.

5. The apparatus according to claim 2, wherein each of the electrode assemblies comprises a threaded bolt extended from the lower electrode plate and inserted through the workbench and a nut engaged with the threaded bolt.

6. The apparatus according to claim 1, wherein each of the uniform gas entrance devices comprises a rectangular gas entrance chamber, a uniform gas entrance pipe, a flexible sealing plate, two crossbars and threaded bolts, and each of the uniform gas exit devices comprises a rectangular gas exit chamber, a uniform gas exit pipe, a flexible sealing plate, two crossbars and threaded bolts.

7. The apparatus according to claim 6, wherein each of the uniform gas entrance and exit pipes comprises at least one aperture therein.

8. The apparatus according to claim 7, wherein the each of the uniform gas entrance and exit pipes comprises a plurality of apertures that get larger further from an entrance end thereof.

9. The apparatus according to claim 1, wherein the atmospheric-pressure plasma activation device and the graft polymerization and curing device are each connected to a high-voltage power supply.

10. The apparatus according to claim 9, wherein the high-voltage power supply is selected from a group consisting of a pulsed power supply and a sinusoidal power supply.

11. The apparatus according to claim 9, wherein the voltage of the high-voltage power supply is 1 to 30 kV.

12. The apparatus according to claim 9, wherein the frequency of the high-voltage power supply is 1 to 100 kHz.

13. The apparatus according to claim 1, wherein working gas for plasma is selected from a group consisting of helium, argon, oxygen, nitrogen, carbon dioxide, air and any combination of them.

\* \* \* \* \*